United States Patent
Kripalani et al.

(10) Patent No.: US 9,201,527 B2
(45) Date of Patent: Dec. 1, 2015

(54) TECHNIQUES TO REMOTELY MANAGE A MULTIMEDIA CONFERENCE EVENT

(75) Inventors: Amit Kripalani, Hyderabad (IN); Ashutosh Tripathi, Hyderabad (IN); Namit Sethumathavan Tanesheri, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1485 days.

(21) Appl. No.: 12/062,536

(22) Filed: Apr. 4, 2008

(65) Prior Publication Data

US 2009/0254839 A1  Oct. 8, 2009

(51) Int. Cl.
  G06F 15/16  (2006.01)
  G06F 3/038  (2013.01)
  G06F 3/023  (2006.01)
  H04L 29/06  (2006.01)
  H04L 29/08  (2006.01)

(52) U.S. Cl.
  CPC ............ G06F 3/0383 (2013.01); G06F 3/0231 (2013.01); *G06F 2203/0384* (2013.01); *H04L 65/4038* (2013.01); *H04L 67/325* (2013.01)

(58) Field of Classification Search
  CPC ............... G06F 3/0231; G06F 3/0383; G06F 2203/0384; H04L 67/325; H04L 65/4038
  USPC .......................................... 709/204; 715/753
  See application file for complete search history.

(56) References Cited

U.S. PATENT DOCUMENTS

| | | | |
|---|---|---|---|
| 5,767,897 A * | 6/1998 | Howell | 348/14.07 |
| 6,091,408 A * | 7/2000 | Treibitz et al. | 715/753 |
| 6,185,535 B1 | 2/2001 | Hedin et al. | |
| 6,339,706 B1 | 1/2002 | Tillgren et al. | |
| 6,526,381 B1 | 2/2003 | Wilson | |
| 6,901,270 B1 | 5/2005 | Beach | |
| 7,133,062 B2 * | 11/2006 | Castles et al. | 348/14.03 |
| 7,233,321 B1 | 6/2007 | Larson et al. | |
| 7,283,808 B2 | 10/2007 | Castell et al. | |
| 7,542,068 B2 * | 6/2009 | Eshkoli et al. | 348/14.08 |
| 7,990,410 B2 * | 8/2011 | Mock et al. | 348/14.01 |
| 8,127,232 B2 * | 2/2012 | Pavley et al. | 715/747 |
| 8,358,327 B2 * | 1/2013 | Duddy et al. | 348/14.03 |
| 2002/0032595 A1 * | 3/2002 | Hundscheidt et al. | 705/8 |
| 2004/0113935 A1 * | 6/2004 | O'Neal et al. | 345/732 |
| 2006/0047513 A1 | 3/2006 | Chen | |

(Continued)

OTHER PUBLICATIONS

"Control Your TV With Your Voice!" http://www.smarthome.com/8169.html.

(Continued)

*Primary Examiner* — David X Yi
(74) *Attorney, Agent, or Firm* — Andrew Smith; Leonard Smith; Micky Minhas

(57) ABSTRACT

Techniques to remotely manage a multimedia conference event are described. An apparatus may comprise a mobile remote control having a communications component operative to establish a wireless connection between a mobile remote control and a multimedia conference server hosting a multimedia conference event. The mobile remote control may include a mobile remote control component communicatively coupled to the communications component, the mobile remote control component operative to manage the multimedia conference event from the mobile remote control by communicating control information and media information with the multimedia conference server for the multimedia conference event over the wireless connection. Other embodiments are described and claimed.

20 Claims, 6 Drawing Sheets

(56) References Cited

U.S. PATENT DOCUMENTS

2006/0075429 A1     4/2006    Istvan et al.
2007/0249336 A1    10/2007    Chi

OTHER PUBLICATIONS

"Voice —Activated TV Remote control", Dated: Jul. 5, 2006, http://tech.yahoo.com/blog/hughes/998.

Vet, et al., "A Personal Digital Assistant as an Advanced Remote Control for Audio/Video Equipment", In Brewster & Dunlop (Eds.), Proceedings of the Second Workshop on Human Computer Interaction with Mobile Devices, Dated: 1999, pp. 87-91.

"Voice Activated Remote Control", available at, http://www.ece.stevens-tech.edu/sd/archive/03F-04S/deliverables/grp17/Fall_Proposal.pdf, 22 Pages.

\* cited by examiner

Mobile Remote Control 190

Client Meeting Component 112

Communications Component 116

Display Component 202

Power Supply Component 204

Mobile Remote Control Component 206

ESTABLISH A WIRELESS CONNECTION BETWEEN A MOBILE REMOTE CONTROL AND A MULTIMEDIA CONFERENCE SERVER HOSTING A MULTIMEDIA CONFERENCE EVENT
*402*

MANAGE THE MULTIMEDIA CONFERENCE EVENT FROM THE MOBILE REMOTE CONTROL BY COMMUNICATING CONTROL INFORMATION AND MEDIA INFORMATION WITH THE MULTIMEDIA CONFERENCE SERVER FOR THE MULTIMEDIA CONFERENCE EVENT OVER THE WIRELESS CONNECTION
*404*

*FIG. 4*

TECHNIQUES TO REMOTELY MANAGE A MULTIMEDIA CONFERENCE EVENT

BACKGROUND

A multimedia conference system typically allows multiple participants to communicate and share different types of media content in a collaborative and real-time meeting over a network. The multimedia conference system may display different types of media content using various graphical user interface (GUI) windows or views. For example, one GUI view might include video images of participants, another GUI view might include presentation slides, yet another GUI view might include text messages between participants, and so forth. In this manner various geographically disparate participants may interact and communicate information in a virtual meeting environment similar to a physical meeting environment where all the participants are within one room.

In a virtual meeting environment there is typically a conference leader or presenter controlling the various media resources for the multimedia conference system. For example, a conference leader may control presentation slides while delivering a speech. In some cases, however, it may be difficult for the conference leader to manage the various media resources provided by the multimedia conference system. This may limit the effective delivery of media content for a meeting. Techniques directed to improving management of media resources in a virtual meeting environment may therefore enhance user experience and convenience.

SUMMARY

Various embodiments may be generally directed to multimedia conference systems. Some embodiments may be particularly directed to techniques to manage media resources for a multimedia conference event. The multimedia conference event may include multiple participants, some of which may gather in a conference room, while others may participate in the multimedia conference event from remote locations. One of the participants may utilize a mobile remote control to manage various media resources for the multimedia conference event.

In one embodiment, for example, an apparatus may comprise a mobile remote control having a communications component operative to establish a wireless connection between a mobile remote control and a multimedia conference server hosting a multimedia conference event. The mobile remote control may include a mobile remote control component communicatively coupled to the communications component, the mobile remote control component operative to manage the multimedia conference event from the mobile remote control by communicating control information and media information with the multimedia conference server for the multimedia conference event over the wireless connection. Other embodiments are described and claimed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 illustrates an embodiment of a mobile remote control.

FIG. 4 illustrates an embodiment of a logic flow.

DETAILED DESCRIPTION

Figure 1:
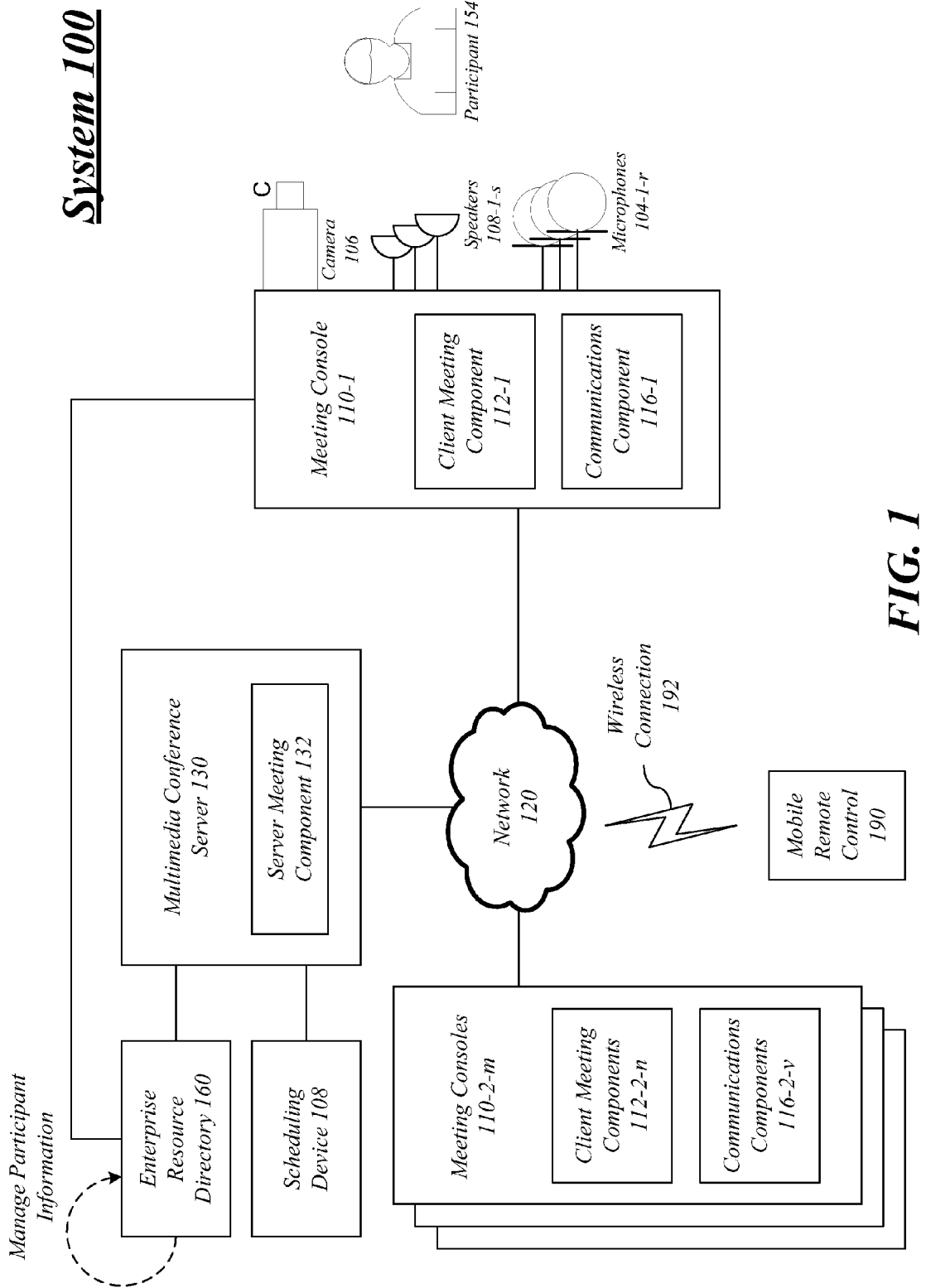
FIG. 1 illustrates an embodiment of a multimedia conference system.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be generally directed to multimedia conference systems arranged to provide meeting and collaboration services to multiple participants over a network. Some multimedia conference systems may be designed to operate with various packet-based networks, such as the Internet or World Wide Web ("web"), to provide web-based conferencing services. Such implementations are sometimes referred to as web conferencing systems. An example of a web conferencing system may include MICROSOFT® OFFICE LIVE MEETING made by Microsoft Corporation, Redmond, Wash. Other multimedia conference systems may be designed to operate for a private network, business, organization, or enterprise, and may utilize a multimedia conference server such as MICROSOFT OFFICE COMMUNICATIONS SERVER made by Microsoft Corporation, Redmond, Wash. It may be appreciated, however, that implementations are not limited to these examples.

A multimedia conference system may include, among other network elements, a multimedia conference server or other processing device arranged to provide web conferencing services. For example, a multimedia conference server may include, among other server elements, a server meeting component operative to control and mix different types of media content for a meeting and collaboration event, such as a web conference. A meeting and collaboration event may refer to any multimedia conference event offering various types of multimedia information in a real-time or live online environment, and is sometimes referred to herein as simply a "meeting event," "multimedia event" or "multimedia conference event."

In one embodiment, the multimedia conference system may further include one or more computing devices implemented as meeting consoles. Each meeting console may be arranged to participate in a multimedia event by connecting to the multimedia conference server. Different types of media information from the various meeting consoles may be received by the multimedia conference server during the multimedia event, which in turn distributes the media information to some or all of the other meeting consoles participating in the multimedia event As such, any given meeting console may have a display with multiple media content views of different types of media content. In this manner various geographically disparate participants may interact and communicate information in a virtual meeting environment similar to a physical meeting environment where all the participants are within one room.

In a virtual meeting environment there is typically a conference leader or presenter controlling the various media resources for the multimedia conference system. For example, a conference leader may control presentation slides while delivering a speech. In some cases, however, it may be difficult for the conference leader to manage the various media resources provided by the multimedia conference system. For example, the conference leader may not have convenient access to a meeting console to participate in the multimedia conference system. In another example, the conference leader may have access to a meeting console but may be incapable of moving from the meeting console during a presentation. This may limit the effective delivery of media content for a meeting.

To solve these and other problems, various embodiments are directed to techniques to remotely manage a multimedia conference event. A conference leader may utilize a mobile remote control to direct, manage or otherwise control various media resources provided by a multimedia conference server. The media resources provided by the multimedia conference server may be controlled via a user interface implemented by the mobile remote control. For example, an operator may use a manual input device, such as a keyboard or pointing device (e.g., stylus, mouse, trackball, touch pad, touch screen, etc.), to enter operator commands into the mobile remote control to control the media resources. Additionally or alternatively, an operator may use an audio input device, such as a microphone, speaker and various audio user interface modules, to enter operator commands into the mobile remote control to control the media resources in a "hands-free" mode of operation.

The mobile remote control may provide various advantages over conventional static or immobile meeting consoles. One advantage is that the mobile remote control provides mobility to a conference leader. For example, a conference leader can move around a conference room or presentation hall when presenting a larger audience. The conference leader can use the mobile remote control to switch presentation slides or to bring certain media content into focus. In another example, a conference leader can be performing other activities or tasks while leading a multimedia conference event, such as a driving a vehicle. The conference leader can use voice command support implemented by the mobile remote control to lead a multimedia conference event without necessarily using her hands. Another advantage is that the mobile remote control provides portability to a conference leader. For example, the mobile remote control may utilize a form factor that is convenient for single hand use, such as the size of a cellular telephone, handheld computer, or smart phone. Yet another advantage is that the mobile remote control provides feedback or status information of a multimedia conference event for the conference leader. For example, the mobile remote control may dynamically render its user interfaces according to the particular media content in focus. In scenarios where there are multiple presenters, this feedback on the mobile remote control helps the conference leader to find out which particular media content is currently highlighted or in focus. The feedback also provides information about the attendees in the meeting and their status.

FIG. 1 illustrates a block diagram for a multimedia conference system 100. Multimedia conference system 100 may represent a general system architecture suitable for implementing various embodiments. Multimedia conference system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although multimedia conference system 100 as shown in FIG. 1 has a limited number of elements in a certain topology, it may be appreciated that multimedia conference system 100 may include more or less elements in alternate topologies as desired for a given implementation. The embodiments are not limited in this context.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In various embodiments, the multimedia conference system 100 may comprise, or form part of, a wired communications system, a wireless communications system, or a combination of both. For example, the multimedia conference system 100 may include one or more elements arranged to communicate information over one or more types of wired communications links. Examples of a wired communications link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The multimedia conference system 100 also may include one or more elements arranged to communicate information over one or more types of wireless communications links. Examples of a wireless communications link may include, without limitation, a radio channel, infrared channel, radio-frequency (RF) channel, Wireless Fidelity (WiFi) channel, a portion of the RF spectrum, and/or one or more licensed or license-free frequency bands.

In various embodiments, the multimedia conference system 100 may be arranged to communicate, manage or process different types of information, such as media information and control information. Examples of media information may generally include any data representing content meant for a user, such as voice information, video information, audio information, image information, textual information, numerical information, application information, alphanumeric symbols, graphics, and so forth. Voice information may comprise a subset of audio information, and is broadly meant to include any information communicated by a human being, such as words, speech, speech utterances, sounds, vocal noise, and so forth. Control information may refer to any data representing commands, instructions or control words meant for an automated system. For example, control information may be used to route media information through a system, to establish a connection between devices, instruct a device to process the media information in a predetermined manner, and so forth.

In various embodiments, multimedia conference system 100 may include a multimedia conference server 130. The multimedia conference server 130 may comprise any logical or physical entity that is arranged to establish, manage or control a multimedia conference call between meeting consoles 110-1-$m$ over a network 120. Network 120 may comprise, for example, a packet-switched network, a circuit-switched network, or a combination of both. In various embodiments, the multimedia conference server 130 may comprise or be implemented as any processing or computing device, such as a computer, a server, a server array or server farm, a work station, a mini-computer, a main frame computer, a supercomputer, and so forth. The multimedia conference server 130 may comprise or implement a general or specific computing architecture suitable for communicating and processing multimedia information. In one embodiment, for example, the multimedia conference server 130 may be implemented using a computing architecture as described with reference to FIG. 5. Examples for the multimedia conference server 130 may include without limitation a MICROSOFT OFFICE COMMUNICATIONS SERVER, a MICROSOFT OFFICE LIVE MEETING server, and so forth.

A specific implementation for the multimedia conference server 130 may vary depending upon a set of communication protocols or standards to be used for the multimedia conference server 130. In one example, the multimedia conference server 130 may be implemented in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. In another example, the multimedia conference server 130 may be implemented in accordance with the International Telecommunication Union (ITU) H.323 series of standards and/or variants. The H.323 standard defines a multipoint control unit (MCU) to coordinate conference call operations. In particular, the MCU includes a multipoint controller (MC) that handles H.245 signaling, and one or more multipoint processors (MP) to mix and process the data streams. Both the SIP and H.323 standards are essentially signaling protocols for Voice over Internet Protocol (VoIP) or Voice Over Packet (VOP) multimedia conference call operations. It may be appreciated that other signaling protocols may be implemented for the multimedia conference server 130, however, and still fall within the scope of the embodiments.

In general operation, multimedia conference system 100 may be used for multimedia conference calls. Multimedia conference calls typically involve communicating voice, video, and/or data information between multiple end points. For example, a public or private packet network 120 may be used for audio conferencing calls, video conferencing calls, audio/video conferencing calls, collaborative document sharing and editing, and so forth. The packet network 120 may also be connected to a Public Switched Telephone Network (PSTN) via one or more suitable VoIP gateways arranged to convert between circuit-switched information and packet information.

To establish a multimedia conference call over the packet network 120, each meeting console 110-1-$m$ may connect to multimedia conference server 130 via the packet network 120 using various types of wired or wireless communications links operating at varying connection speeds or bandwidths, such as a lower bandwidth PSTN telephone connection, a medium bandwidth DSL modem connection or cable modem connection, and a higher bandwidth intranet connection over a local area network (LAN), for example.

In various embodiments, the multimedia conference server 130 may establish, manage and control a multimedia conference call between meeting consoles 110-1-$m$. In some embodiments, the multimedia conference call may comprise a live web-based conference call using a web conferencing application that provides full collaboration capabilities. The multimedia conference server 130 operates as a central server that controls and distributes media information in the conference. It receives media information from various meeting consoles 110-1-$m$, performs mixing operations for the multiple types of media information, and forwards the media information to some or all of the other participants. One or more of the meeting consoles 110-1-$m$ may join a conference by connecting to the multimedia conference server 130. The multimedia conference server 130 may implement various admission control techniques to authenticate and add meeting consoles 110-1-$m$ in a secure and controlled manner.

In various embodiments, the multimedia conference system 100 may include one or more computing devices implemented as meeting consoles 110-1-$m$ to connect to the multimedia conference server 130 over one or more communications connections via the network 120. For example, a computing device may implement a client application that may host multiple meeting consoles each representing a separate conference at the same time. Similarly, the client application may receive multiple audio, video and data streams. For example, video streams from all or a subset of the participants may be displayed as a mosaic on the participant's display with a top window with video for the current active speaker, and a panoramic view of the other participants in other windows.

The meeting consoles 110-1-$m$ may comprise any logical or physical entity that is arranged to participate or engage in a multimedia conference call managed by the multimedia conference server 130. The meeting consoles 110-1-$m$ may be implemented as any device that includes, in its most basic form, a processing system including a processor and memory, one or more multimedia input/output (I/O) components, and a wireless and/or wired network connection. Examples of multimedia I/O components may include audio I/O components (e.g., microphones, speakers), video I/O components (e.g., video camera, display), tactile (I/O) components (e.g., vibrators), user data (I/O) components (e.g., keyboard, thumb board, keypad, touch screen), and so forth. Examples of the meeting consoles 110-1-*m* may include a telephone, a VoIP or VOP telephone, a packet telephone designed to operate on the PSTN, an Internet telephone, a video telephone, a cellular telephone, a personal digital assistant (PDA), a combination cellular telephone and PDA, a mobile computing device, a smart phone, a one-way pager, a two-way pager, a messaging device, a computer, a personal computer (PC), a desktop computer, a laptop computer, a notebook computer, a handheld computer, a network appliance, and so forth. In some implementations, the meeting consoles 110-1-*m* may be implemented using a general or specific computing architecture similar to the computing architecture described with reference to FIG. 5.

The meeting consoles 110-1-*m* may comprise or implement respective client meeting components 112-1-*n*. The client meeting components 112-1-*n* may be designed to interoperate with the server meeting component 132 of the multimedia conference server 130 to establish, manage or control a multimedia conference event. For example, the client meeting components 112-1-*n* may comprise or implement the appropriate application programs and user interface controls to allow the respective meeting consoles 110-1-*m* to participate in a web conference facilitated by the multimedia conference server 130. This may include input equipment (e.g., video camera, microphone, keyboard, mouse, controller, etc.) to capture media information provided by the operator of a meeting console 110-1-*m*, and output equipment (e.g., display, speaker, etc.) to reproduce media information by the operators of other meeting consoles 110-1-*m*. Examples for client meeting components 112-1-*n* may include without limitation a MICROSOFT OFFICE COMMUNICATOR or the MICROSOFT OFFICE LIVE MEETING Windows Based Meeting Console, and so forth.

As shown in the illustrated embodiment of FIG. 1, a representative meeting console 110-1 may be connected to various multimedia input devices and/or multimedia output devices capable of capturing, communicating or reproducing multimedia information. The multimedia input devices may comprise any logical or physical device arranged to capture or receive as input multimedia information from one or more operators or participants of the meeting console 110-1, including audio input devices, video input devices, image input devices, text input devices, and other multimedia input equipment. Examples of multimedia input devices may include without limitation video cameras, microphones, microphone arrays, conference telephones, whiteboards, interactive whiteboards, voice-to-text components, text-to-voice components, voice recognition systems, pointing devices, keyboards, touchscreens, tablet computers, handwriting recognition devices, and so forth. An example of a video camera may include a ringcam, such as the MICROSOFT ROUNDTABLE made by Microsoft Corporation, Redmond, Wash. The MICROSOFT ROUNDTABLE is a videoconferencing device with a 360 degree camera that provides remote meeting participants a panoramic video of everyone sitting around a conference table. The multimedia output devices may comprise any logical or physical device arranged to reproduce or display as output multimedia information to one or more operators or participants of the meeting consoles 110-1, including audio output devices, video output devices, image output devices, text input devices, and other multimedia output equipment. Examples of multimedia output devices may include without limitation electronic displays, video projectors, speakers, vibrating units, printers, facsimile machines, and so forth.

In the illustrated embodiment shown in FIG. 1, the representative meeting console 110-1 may include various multimedia input devices arranged to capture media content from one or more participants 154-1-*p*, and stream the media content to the multimedia conference server 130. The meeting console 110-1 includes various types of multimedia input equipment, such as a video camera 106 and an array of microphones 104-1-*r*. The video camera 106 may capture video content including video content of one or more participants 154-1-*p* within video capture range of the video camera 106, and stream the video content to the multimedia conference server 130 via the meeting console 110-1. Similarly, audio input devices such as the array of microphones 104-1-*r* may capture audio content including audio content from one or more participants 154-1-*p* within audio capture range of the microphones 104-1-*r*, and stream the audio content to the multimedia conference server 130 via the meeting console 110-1. The meeting console may also include various multimedia output devices, such as one or more speakers 108-1-*s* and an electronic display. Audio output devices such as the one or more speakers 108-1-*s* may reproduce audio content for the participants 154-1-*p*. Video output devices such as the electronic display may be used to reproduce video content from other participants using remote meeting consoles 110-2-*m* received via the multimedia conference server 130.

The meeting consoles 110-1-*m* and the multimedia conference server 130 may communicate media information and control information utilizing various media connections established for a given multimedia conference event. In one embodiment, for example, the meeting consoles 110-1-*m* may each comprise a respective communications component 116-1-*v*. The communications components 116-1-*v* may comprise various communications resources suitable for establishing the various media connections. Examples of the communications resources may include transmitters, receivers, transceivers, radios, network interfaces, network interface cards, processors, memory, media access control (MAC) layer parts, physical (PHY) layer parts, connectors, communications media, communications interfaces, and so forth.

The communications components 116-1-*v* may establish media connections in general, and audio connections in particular, using various VoIP signaling protocols, such as the SIP series of protocols. The SIP series of protocols are application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these. SIP is designed as part of the overall IETF multimedia data and control architecture currently incorporating protocols such as the resource reservation protocol (RSVP) (IEEE RFC 2205) for reserving network resources, the real-time transport protocol (RTP) (IEEE RFC 1889) for transporting real-time data and providing Quality-of-Service (QOS) feedback, the real-time streaming protocol (RTSP) (IEEE RFC 2326) for controlling delivery of streaming media, the session announcement protocol (SAP) for advertising multimedia sessions via multicast, the session description protocol (SDP) (IEEE RFC 2327) for describing multimedia sessions, and others. For example, the meeting consoles 110-1-*m* may use SIP as a signaling channel to setup the media connections, and RTP as a media channel to transport media information over the media connections.

The communications components 116-1-*v* may establish media connections using various circuit-switched tech niques. For example, the communications components 116-1-v may establish a media connection using Pulse Code Modulation (PCM) signals over a circuit-switched network. An example of a circuit-switched network may include the Public Switched Telephone Network (PSTN), a private network, and so forth.

In general operation, a schedule device 108 may be used to generate a multimedia conference event reservation for the multimedia conference system 100. The scheduling device 108 may comprise, for example, a computing device having the appropriate hardware and software for scheduling multimedia conference events. For example, the scheduling device 108 may comprise a computer utilizing MICROSOFT OFFICE OUTLOOK® application software, made by Microsoft Corporation, Redmond, Wash. The MICROSOFT OFFICE OUTLOOK application software comprises messaging and collaboration client software that may be used to schedule a multimedia conference event. An operator may use MICROSOFT OFFICE OUTLOOK to convert a schedule request to a MICROSOFT OFFICE LIVE MEETING event that is sent to a list of meeting invitees. The schedule request may include a hyperlink to a virtual room for a multimedia conference event. An invitee may click on the hyperlink, and the meeting console 110-1-m launches a web browser, connects to the multimedia conference server 130, and joins the virtual room. Once there, the participants can present a slide presentation, annotate documents or brainstorm on the built in whiteboard, among other tools.

In a virtual meeting environment there is typically a conference leader or presenter controlling the various media resources for the multimedia conference system. For example, a conference leader may control presentation slides while delivering a speech. In some cases, however, it may be difficult for the conference leader to manage the various media resources provided by the multimedia conference system. For example, the conference leader may not have convenient access to a meeting console to participate in the multimedia conference system. In another example, the conference leader may have access to a meeting console but may be incapable of moving from the meeting console during a presentation. This may limit the effective delivery of media content for a meeting.

To solve these and other problems, various embodiments are directed to techniques to remotely manage a multimedia conference event. A conference leader may utilize a mobile remote control 190 to direct, manage or otherwise control various media resources provided by the multimedia conference server 130. The mobile remote control 190 may establish a wireless connection 192 with the multimedia conference server 130 to participate in a multimedia conference event with one or more of the meeting consoles 110-1-m. Furthermore, an operator may assume the role of a conference leader and utilize the mobile remote control 190 to direct, manage or otherwise control various media resources and multimedia conference features provided by the multimedia conference server 130. This may be accomplished using manual user interface controls or voice commands. In this manner, a conference leader may utilize the mobility and portability of the mobile remote control 190 to direct, manage or control media resources and features for a multimedia conference event with increased convenience to the conference leader. The multimedia conference system 100 in general, and the mobile remote control 190 in particular, may be described in more detail with reference to FIG. 2.

FIG. 2 illustrates a more detailed block diagram for the mobile remote control 190. The mobile remote control 190 may be implemented using any mobile device having computing capabilities, wireless communication capabilities, a form factor suitable for being held by a single average human hand, and a portable power supply such as one or more batteries. Examples for the mobile remote control 190 may include without limitation a mobile phone, a cellular telephone, a PDA, a combination cellular telephone and PDA, a handheld computer, a mobile computing device, a smart phone, digital media player, and so forth. In one embodiment, for example, the mobile remote control 190 may be implemented as a handheld computer such as a MICROSOFT ZUNE® made by Microsoft Corporation, Redmond, Wash. The embodiments, however, are not limited to this example. In some implementations, the mobile remote control 190 may be implemented using a general or specific computing architecture similar to the computing architecture described with reference to FIG. 5.

In the illustrated embodiment shown in FIG. 2, the mobile remote control 190 includes the client meeting component 112 and the communications component 116 as described with reference to the meeting consoles 110-1-m. In addition, the mobile remote control 190 may also include a display component 202, a power supply component 204, and a mobile remote control component 206. With the client meeting component 112, the communications component 116, and the display component 202, the mobile remote control 190 may implement some or all of the functionality of the meeting consoles 110-1-m in order to participate in a multimedia conference event. With the addition of the mobile remote control component 206, the mobile remote control 190 may also be used to remotely manage the multimedia conference event via interoperation with the server meeting component 132 of the multimedia conference server 130.

The display component 202 may include a digital electronic display for the presentation of information supplied as an electrical signal for visual or tactile reception. Examples of digital electronic displays may include without limitation electronic paper, nixie tube displays, vacuum fluorescent displays, light-emitting diode displays, electroluminescent displays, plasma display panels, liquid crystal displays, thin-film transistor displays, organic light-emitting diode displays, surface-conduction electron-emitter displays, laser television displays, carbon nanotubes, nanocrystal displays, and so forth. In one embodiment, for example, the display component 202 may be implemented as a touch screen display.

The power supply component 204 may include one or more portable rechargeable direct current (DC) batteries. Examples of DC batteries may include without limitation a nickel-cadmium (NiCd) cell, a nickel metal hydride (NiMH) cell, a lithium-ion (Li-Ion) cell, and so forth.

In one embodiment, for example, the communications component 116 may be operative to establish the wireless connection 192 between the mobile remote control 190 and the multimedia conference server 130 hosting a multimedia conference event. Examples of the wireless connection 192 may include without limitation a radio channel, infrared channel, RF channel, WiFi channel, a portion of the RF spectrum, and/or one or more licensed or license-free frequency bands.

The mobile remote control component 206 may be communicatively coupled to the communications component 116. The mobile remote control component 206 may implement control logic and user interfaces for remotely managing media resources for a multimedia conference event hosted by the multimedia conference server 130. More particularly, the mobile remote control component 206 may be operative to manage a multimedia conference event from the mobile remote control 190 by communicating control information and media information with the multimedia conference server 130 for the multimedia conference event over the wireless connection 192.

The mobile remote control component 206 may implement remote control operations to direct, manage or otherwise control an online conferencing tool from a mobile device with voice commands capabilities. The mobile remote control component 206 may be used by a conference leader or presenter who is presenting for the multimedia conference event, such as a conference meeting. The mobile remote control component 206 enables the operator to control basic and enhanced functionalities of the meeting from the mobile remote control 190.

By way of example, assume a presenter joins a multimedia conference event using the mobile remote control 190. The presenter will then have the ability to view some or all of the media content uploaded during the meeting on the mobile remote control 190. The presenter can then invoke media content such as a slide set and switch slides for the multimedia conference event from the mobile remote control 190. The mobile remote control component 206 also supports other conference functions or features for the presenter such as muting and attendee, removing an attendee from a meeting, changing meeting status (e.g., mood), and so forth. The presenter can choose to use the on screen user interface (or hardware buttons) or voice commands to trigger a command on the mobile remote control 190.

In addition to manual operator commands, the mobile remote control 190 also supports context related voice commands. The mobile remote control component 206 automatically adapts to the media content currently viewed by the operator, and supports some or all of the available commands related to the various media content. The mobile remote control component 206 also supports a context sensitive tool bar.

The mobile remote control component 206 also takes feedback from the online conferencing tool to keep the operator informed about the current context for a multimedia conference event. The feedback may include a preview of the content currently in focus and the list of attendees currently in the meeting.

The control logic built into the mobile remote control component 206 takes care of updating a context related tool bar and a preview window or pane generated by the GUI implemented by the mobile remote control component 206. The control logic also updates the voice commands shell, thereby informing the mobile remote control component 206 about what commands it can expect at that point of time. This may include the creation of grammar files at run time which goes as input to the voice command shell.

Figure 3:
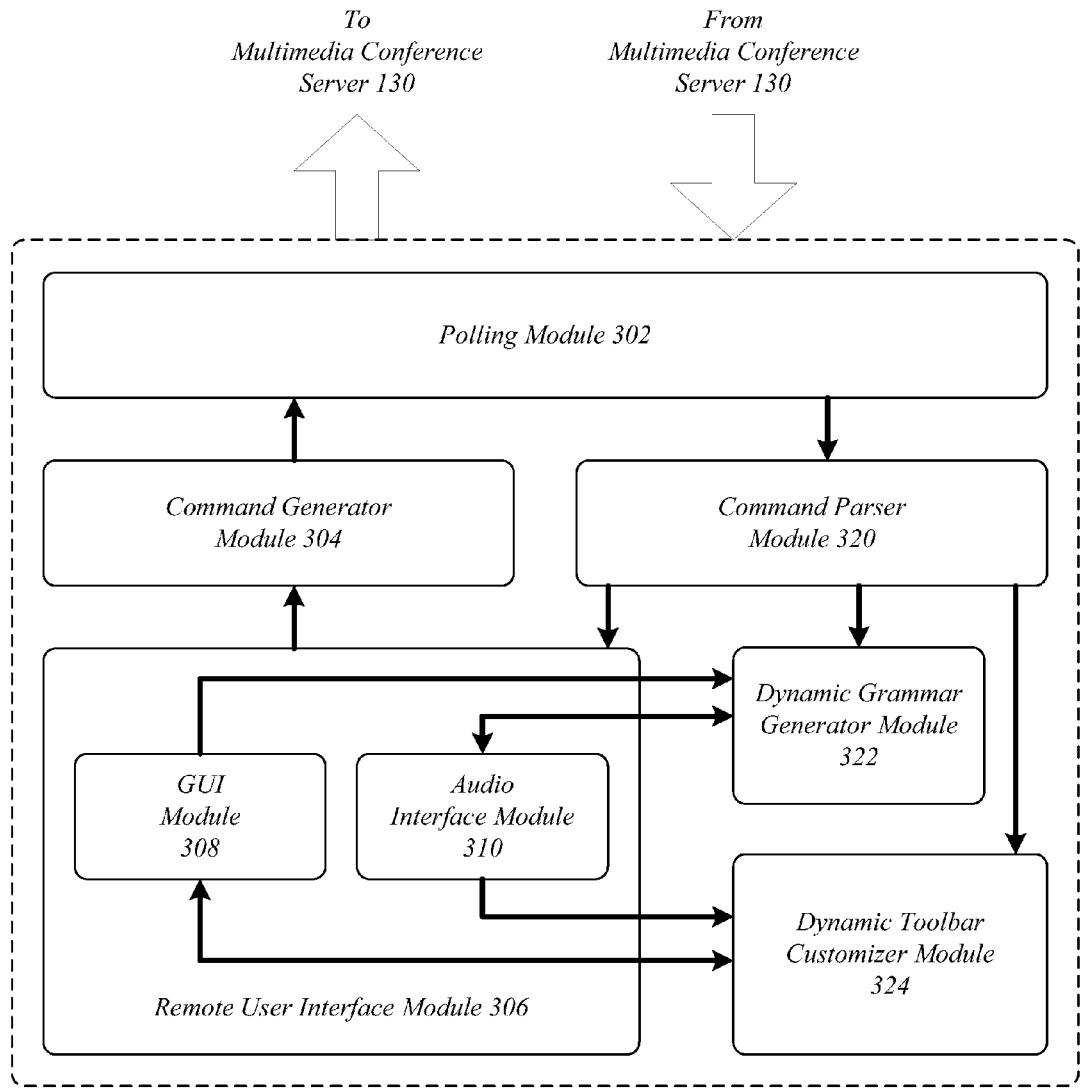
FIG. 3 illustrates an embodiment of a mobile remote control component.

FIG. 3 illustrates a block diagram for the mobile remote control component 206. The mobile remote control component 206 may comprise multiple modules. In the illustrated embodiment shown in FIG. 3, for example, the mobile remote control component 206 includes a polling module 302, a command generator module 304, a remote user interface module 306, a command parser 320, a dynamic grammar generator module 322, and a dynamic toolbar customizer module 324. Each of the modules may be implemented using hardware elements, software elements, or a combination of hardware elements and software elements. Although the mobile remote control component 206 as shown in FIG. 3 has a limited number of elements in a certain topology, it may be appreciated that the mobile remote control component 206 may include more or less elements in alternate topologies as desired for a given implementation. The embodiments are not limited in this context.

The polling module 302 may be arranged to interface with the multimedia conference server 130. The polling module 302 may be configured to continuously or periodically communicate control information and media information between the mobile remote control 190 and the server meeting component 132 of the multimedia conference server 130.

In one embodiment, for example, the polling module 302 and the multimedia conference server 130 may follow a push model where control and media information are pushed to each other when the information is ready for transmission. In this manner, the wireless connection 192 may be in continuous service, particularly when the multimedia conference server 130 is experiencing heavy traffic loads. The push model has the advantage of reducing latency at the expense of increasing power consumption.

Since the mobile remote control 190 is a mobile device utilizing a portable power supply component 204, however, maintaining continuous communications with the multimedia conference server 130 may significantly increase power consumption thereby reducing the amount of energy needed to power the mobile remote control 190. To extend battery life, the polling module 302 may implement a pull model where control and media information are pulled from each other when the information is ready for reception. For example, the polling module 302 may periodically or on demand poll the multimedia conference server 130 to determine whether the server meeting component 132 has any information ready for transmission using a poll request. If so, the polling module 302 may pull the information from the multimedia conference server 130. The pull model has the advantage of decreased power consumption at the expense of increasing latency in data transmissions. The polling period may be a configurable parameter, thereby allowing the operator to select the amount of latency that can be tolerated against the amount of battery life remaining for the mobile remote control 190.

In one embodiment, the polling module 302 may implement a hybrid push and pull model to realize some of the advantages of both models while reducing the corresponding disadvantages. For example, the polling module 302 may utilize a pull model to receive information from the multimedia conference server 130 to increase battery life, and a push model to send control information to the multimedia conference server 130 to reduce latency.

The command generator module 304 may be communicatively coupled to the polling module 302. The command generator module 304 may be arranged to generate control directives for the multimedia conference server 130 from operator input commands or operator voice commands. The command generator module 304 may map various operator input command or operator voice commands received by the remote user interface module 306 to a set of API commands used by the server meeting component 132 of the multimedia conference server 130. In this manner, the mobile remote control 190 may be interoperable with different types of multimedia conferencing applications implemented by the multimedia conference server 130. Furthermore, the remote user interface module 306 may be trained to accept various types of operator input commands or voice commands to control the media resources or various multimedia conference controls provided by the server meeting component 132. For example, a conference leader or presenter could train the remote user interface module 306 to accept multiple operator voice commands such as "next slide" or "slide," and the command generator module 304 may map the multiple operator voice commands to the appropriate API to control the presentation slides shown in the virtual meeting environment.

The remote user interface module 306 may be communicatively coupled to the command generator module 304. The remote user interface module 306 may be generally arranged to provide various visual or tactile GUI views for an operator, and accept various forms of operator commands and other input from an operator.

The remote user interface module 306 may comprise a GUI module 308. The GUI module 308 may be arranged to receive operator input commands and display media content from the multimedia conference server 130. The GUI module 308 may generate and display various on screen input controls to control media resources for the multimedia conference event. For example, the screen input controls may be designed to control various audio resources, video resources and other media resources, such as managing live and recorded video, chat, slide and application sharing, Voice over Internet Protocol (VoIP) and PSTN audio, and audience feedback tools. The GUI module 308 may also display various toolbars to allow an operator to select various features and options for the mobile remote control 190, such as provided by the client meeting component 112, the server meeting component 132, the mobile remote control component 206, or an operating system (OS) program. The various toolbars may be dynamic and change according to a current context for the multimedia conference event.

The GUI module 308 may also generate a GUI view to display media content received from the multimedia conference server 130 in a preview pane. The GUI module 308 may receive feedback information from the multimedia conference server 130 to keep the operator informed about the current context for a multimedia conference event. The feedback may include a preview of the media content currently in focus and the list of attendees currently in the meeting. In one embodiment, for example, the preview pane may be part of a GUI view displayed on a touch screen display implemented as the display component 202.

The remote user interface module 306 may further comprise an audio interface module 310. The audio interface module 310 may be arranged to receive operator voice commands, and reproduce narrations for media content received from the multimedia conference server. In addition to manual operator commands, the mobile remote control 190 may use the audio interface module 310 to support context related voice commands. The audio interface module 310 automatically adapts to the media content currently viewed by the operator, and supports some or all of the available commands related to the various media content. The audio interface module 310 creates and manages a voice commands shell, and periodically updates the voice commands shell with customized operator commands. Furthermore, the audio interface module 310 may audibly reproduce control information or media information for an operator. This may be convenient, for example, if the operator is working in a hands-free environment, such as when driving. The operator could control the media resources for the multimedia conference event, and receive feedback from the multimedia conference event, using a completely audio-based interface thereby reducing or removing the need for the user to manually operate the mobile remote control 190.

The command parser module 320 may be communicatively coupled to the polling module 302. The command parser module 320 may be arranged to parse control directives for the mobile remote control received from the multimedia conference server 130. As with the mobile remote control 190 sending control directives to the multimedia conference server 130, the multimedia conference server 130 may periodically send control directives to the mobile remote control 190 as well. For example, the server meeting component 132 of the multimedia conference server 130 may periodically configuration information, diagnostic information, connection repair information or capabilities information to the mobile remote control 190 to enhance operations for the mobile remote control 190, or interoperability with the server meeting component 132. The server meeting component 132 may also send updated API commands, or different command tools based on the currently displayed media content for a multimedia conference event. The command parser module 320 may receive the control directives, parse the control directives and output the parsed control directives to the remote user interface module 306 for visual or audio reproduction of the control directives to an operator.

The dynamic grammar generator module 322 may be communicatively coupled to the command parser module 320, as well as the GUI module 308 and the audio interface module 310. The dynamic grammar generator module 322 may be arranged to generate context related voice commands. For example, the dynamic grammar generator module 322 may create or generate grammar files at run time. The grammar files may be used as input for the voice command shell used by the audio interface module 310.

The dynamic toolbar customizer module 324 may also be communicatively coupled to the command parser module 320, as well as the GUI module 308 and the audio interface module 310. The dynamic toolbar customizer module 324 may be arranged to create and generate a context sensitive tool bar for the GUI module 308. The context sensitive tool bar may display various options or features based on a current context for the multimedia conference event. For example, the context sensitive tool bar may display a first set of options or features when a presentation slide deck is in focus and currently active, a second set of options or features when a chat window is in focus and currently active, a third set of options or features when a streaming video window is in focus and currently active, and so forth.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 4 illustrates one embodiment of a logic flow 400. Logic flow 400 may be representative of some or all of the operations executed by one or more embodiments described herein.

As shown in FIG. 4, the logic flow 400 may establish a wireless connection between a mobile remote control and a multimedia conference server hosting a multimedia conference event at block 402. For example, the communications component 116 of the mobile remote control 190 may establish the wireless connection 192 between the mobile remote control 190 and the multimedia conference server 130 hosting a multimedia conference event. The wireless connection 192 may comprise, for example, a wireless local area network (WLAN) connection (e.g., IEEE 802.11, 802.16, 802.20, and variants) or a cellular network connection (e.g., using a Code Division Multiple Access system, Global System for Mobile Communications system, Time Division Multiple Access system, Universal Mobile Telephone System, and so forth).

The logic flow 400 may manage the multimedia conference event from the mobile remote control by communicating control information and media information with the multimedia conference server for the multimedia conference event over the wireless connection at block 404. For example, the mobile remote control component 206 may manage the multimedia conference event from the mobile remote control 190 by communicating control information and media information with the multimedia conference server 130 for the multimedia conference event over the wireless connection 192. The mobile remote control component 206 may manage various features, options or functionality provided by the server meeting component 132 of the multimedia conference server 130, and receive multimedia conference event feedback information from the server meeting component 132. The mobile remote control 190 may also participate in the multimedia conference event and communicate multimedia conference event information with the server meeting component 132 in a manner similar to the meeting consoles 110-1-$m$ utilizing the client meeting component 112.

Figure 5:
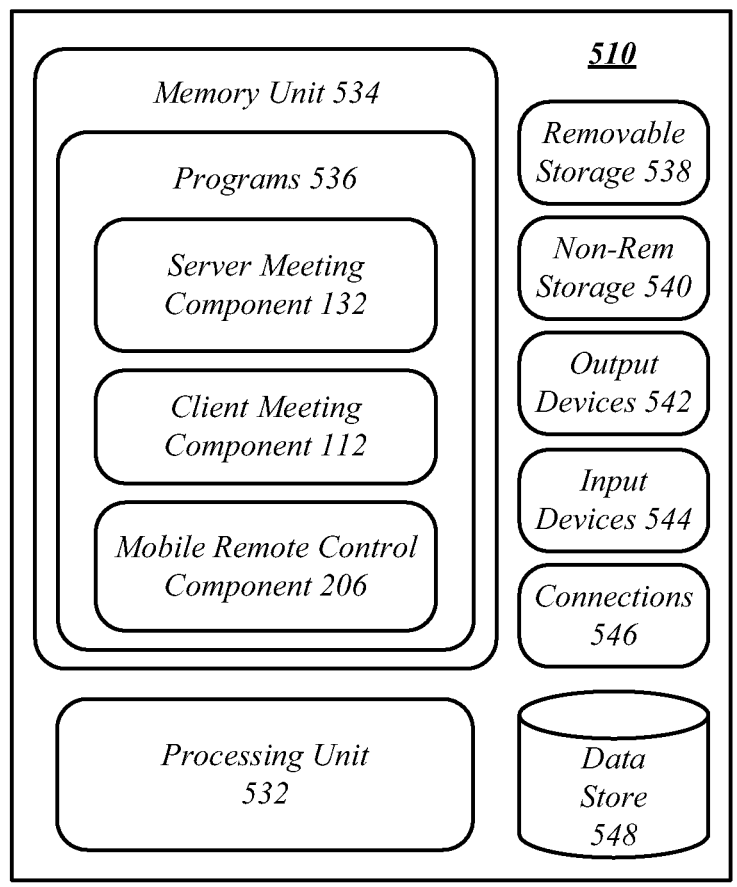
FIG. 5 illustrates an embodiment of a computing architecture.

FIG. 5 further illustrates a more detailed block diagram of computing architecture 510 suitable for implementing the mobile remote control 190, meeting consoles 110-1-$m$ and/or the multimedia conference server 130. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more application programs 536-1-$t$ and accompanying data. Depending on the implementation, examples of application programs 536-1-$t$ may include server meeting component 132, client meeting components 112-1-$n$, or the mobile remote control component 206.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may be representative of, for example, the communications interfaces for the communications components 116-1-$v$. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
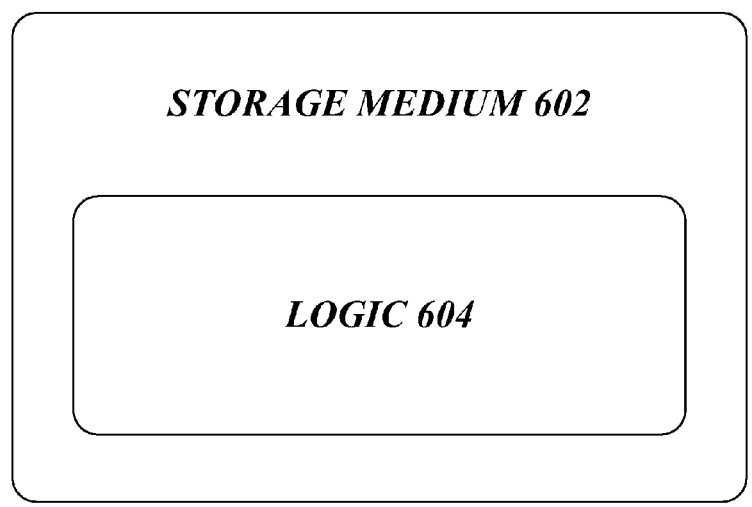
FIG. 6 illustrates an embodiment of an article.

FIG. 6 illustrates a diagram an article of manufacture 600 suitable for storing logic for the various embodiments, including the logic flow 400. As shown, the article of manufacture 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    establishing a wireless connection between a mobile remote control and a multimedia conference server hosting a multimedia conference event;
    managing, from the mobile remote control, one or more media resources provided by the multimedia conference server for the multimedia conference event, by communicating control information and media information with the multimedia conference server for the multimedia conference event over the wireless connection using a pull model, where the control information or the media information is pulled from the multimedia conference server when the mobile remote control is ready to receive the control information or the media information;
    generating grammar for context related voice commands; and
    updating a context-sensitive toolbar of a graphical user interface (GUI) view on a display of the mobile remote control based on a current context for the multimedia conference event.

2. The method of claim 1, comprising generating control directives for the multimedia conference server from operator input commands received from a GUI module.

3. The method of claim 1, comprising managing the multimedia conference event from the mobile remote control using operator voice commands.

4. The method of claim 1, comprising generating control directives for the multimedia conference server from operator voice commands received from an audio interface module.

5. The method of claim 1, comprising mapping client control directives from the mobile remote control to server control directives for the multimedia conference server.

6. The method of claim 1, comprising parsing control directives for the mobile remote control received from the multimedia conference server.

7. The method of claim 1, comprising mapping server control directives from the multimedia conference server to client control directives for the mobile remote control.

8. The method of claim 1, comprising reproducing narrations for media content received from the multimedia conference server.

9. The method of claim 1, comprising generating grammar for context related voice commands at run time for media content currently being viewed by an operator.

10. The method of claim 1, comprising displaying media content received from the multimedia conference server in a preview pane of the GUI view.

11. An article of manufacture comprising a non-transitory storage medium containing instructions that if executed enable a system to:
    establish a wireless connection between a mobile remote control and a multimedia conference server hosting a multimedia conference event;
    manage, from the mobile remote control, one or more media resources provided by the multimedia conference server for the multimedia conference event, by communicating control information and media information with the multimedia conference server for the multimedia conference event over the wireless connection using a pull model, where the control information or the media information is pulled from the multimedia conference server when the mobile remote control is ready to receive the control information or the media information;
    generate grammar for context related voice commands;
    update a voice commands shell of an audio interface with the grammar; and
    update a context-sensitive toolbar of a graphical user interface (GUI) view on a display of the mobile remote control based on a current context for the multimedia conference event.

12. The article of manufacture of claim 11, further comprising instructions that if executed enable the system to map client control directives from the mobile remote control to server control directives for the multimedia conference server, and server control directives from the multimedia conference server to client control directives for the mobile remote control.

13. The article of manufacture of claim 11, further comprising instructions that if executed enable the system to manage the multimedia conference event from the mobile remote control using operator voice commands.

14. The article of manufacture of claim 11, further comprising instructions that if executed enable the system to generate control directives for the multimedia conference server from operator voice commands received from an audio interface module.

15. A mobile remote control, comprising:
a display;
a communications component operative to establish a wireless connection between a mobile remote control and a multimedia conference server hosting a multimedia conference event;
a mobile remote control component communicatively coupled to the communications component and the display, the mobile remote control component operative to manage, from the mobile remote control, one or more media resources provided by the multimedia conference server for the multimedia conference event, by communicating control information and media information with the multimedia conference server for the multimedia conference event over the wireless connection using a pull model, where the control information or the media information is pulled from the multimedia conference server when the mobile remote control is ready to receive the control information or the media information, the mobile remote control component comprising a dynamic toolbar customizer module operative to update a context-sensitive toolbar of a graphical user interface (GUI) view on the display based on a current context for the multimedia conference event, the mobile remote control component comprising a dynamic grammar generator module to generate a grammar for context related voice commands; and
a processor implementing one or both of the communications component or the mobile remote control component.

16. The apparatus of claim 15, the mobile remote control component comprising a command generator module operative to generate control directives for the multimedia conference server from operator input commands or operator voice commands.

17. The apparatus of claim 15, the mobile remote control component comprising a remote user interface module, the remote user interface module including a graphical user interface module operative to receive operator input commands and display media content from the multimedia conference server in the GUI view.

18. The apparatus of claim 15, the mobile remote control component comprising a remote user interface module, the remote user interface module including an audio interface module operative to receive operator voice commands, and reproduce narrations for media content received from the multimedia conference server.

19. The apparatus of claim 15, the mobile remote control component comprising a command parser module operative to parse control directives for the mobile remote control received from the multimedia conference server.

20. The apparatus of claim 15, the display comprising a touch screen display, the touch screen display operative to display media content received from the multimedia conference server in a preview pane of the GUI view.

\* \* \* \* \*